Jan. 14, 1969   F. H. OSBORNE ET AL   3,421,941
BATTERY
Filed Aug. 7, 1956

INVENTORS
Fred H. Osborne
Charles J. Hull

BY
W. E. Thibodeau, A. W. Pew & J. D. Edgerton
ATTORNEYS

3,421,941
BATTERY

Fred H. Osborne, Snyder, and Charles J. Hull, Williamsville, N.Y., assignors to the United States of America as represented by the Secretary of the Army
Filed Aug. 7, 1956, Ser. No. 602,685
U.S. Cl. 136—83                                     1 Claim
Int. Cl. H01m 23/00; H01m 17/06

The invention described herein may be manufactured and used by or for the Government for governmental purposes without the payment to us of any royalty thereon.

This invention relates to the type of thermal battery that comprises at least one cell having an electrolyte that is inert at ordinary temperatures and that includes thermal means for activating the battery by raising the temperature of the electrolyte.

Briefly, one preferred battery in accordance with the present invention is a compact device in the form of a cylinder less than 1½ inches long and less than 1½ inches in diameter. This embodiment has an A section and a B section. Even after a long period—at least several years—of inactive storage, this embodiment may be rapidly activated to produce, for about 1 minute, about 1.4 volts at about 400 milliamperes from the A section and 140 volts at 15 milliamperes from the B section. This embodiment may be considered to be built around a cylindrical block of ignitable thermite-type material. The A section consists of a single cell that surrounds the cylindrical block. This A cell comprises (a) an outer electrode consisting of inner and outer thin closely spaced metallic tubes joined at their ends, (b) an electrolyte consisting of two layers of suitably impregnated inert paper or cloth interposed between the two tubes, and (c) an inner electrode in the form of a sheet of a different metal interposed betwen the two impregnated layers. The B section comprises a number of cylindrical stacks, each stack consisting of a number of discoid individual cells, the stacks being mounted in longitudinal holes in the cylindrical block. A friction-match-type acceleration-responsive igniter, mounted in another hole the axis of which is likewise parallel to the axis of the block, is adapted to cause ignition of the block in response to acceleration forces of a magnitude to be expected in an ordnance projectile. Resulting combustion of the block melts and activates the normally-inert electrolytes of the A and B cells.

A principal object of the invention is to provide an improved, compact, low-cost, thermal-type reserve battery having a low-voltage A section and a higher-voltage B section, adapted to use in ordnance projectiles.

Another object is to provide an improved, compact, low-cost construction for individual electrochemical cells adapted to be stacked in series to obtain higher voltages.

Still another object is to provide an improved electrochemical cell of generally tubular form.

A further object is to provide improved electrolytes for use in thermal batteries.

A still further object is to provide an improved thermite-type heating material, adapted to be formed into solid blocks having—during burning and after the completion of burning, as well as before ignition—good mechanical strength and relatively constant physical dimensions.

Other objects, aspects, uses, and advantages of the invention will become apparent from the following description and from the accompanying drawing, in which.

Figure 1:
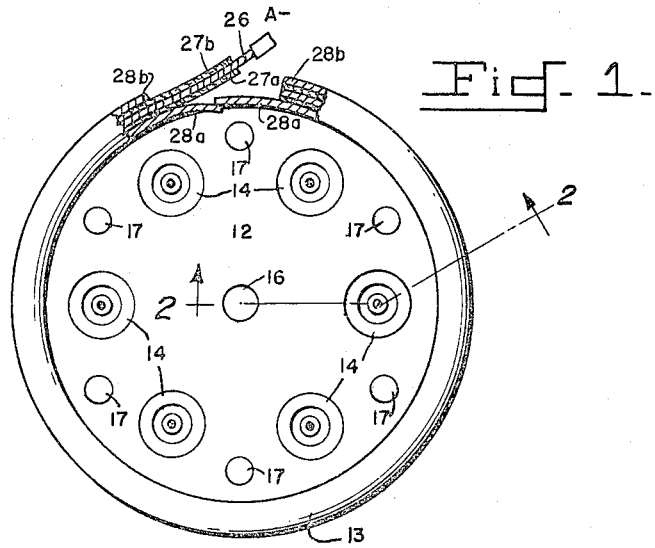
FIG. 1 is a plan view of the thermal battery of the invention, partly in section and with an end disc removed.
Figure 2:
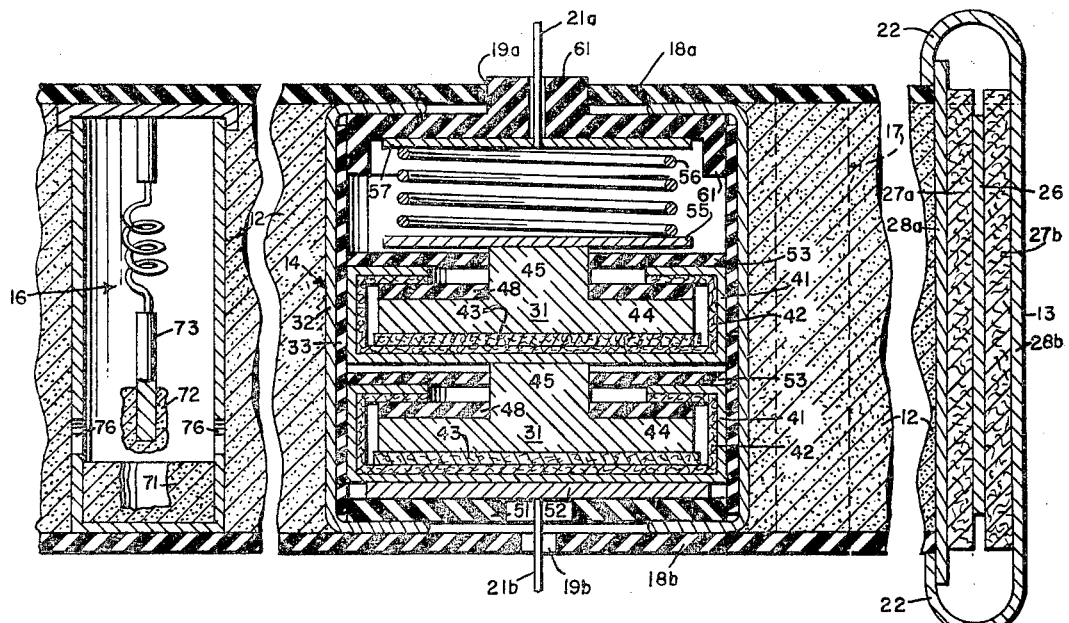
FIG. 2 is a fragmentary sectional view taken along line 2—2 of FIG. 1.

In FIGS. 1 and 2, a cylindrical block 12 of thermite-type ignitible material serves both as a mechanical matrix and as a source of heat for an A-cell 13 and for a number of B-stacks 14 of B cells 31. B-stacks 14 are of cylindrical form and are fitted into holes extending longitudinally through block 12. An acceleration-responsive friction-type igniter 16, of generally cylindrical form, fits into another hole that extends longitudinally through the center of block 12 and is adapted to ignite block 12 in response to forces of acceleration corresponding to those to which an ordnance projectile is subjected upon firing. Such igniters are known, and no novelty is claimed for igniter 16. A number of thermally conductive metal heat rods 17 are preferably provided, mounted in additional holes extending longitudinally through block 12, as aids to the rapid and uniform distribution of heat after ignition. Circular end discs 18a and 18b, which are of ceramic or other electrical nonconductor and which are provided with appropriate holes 19a and 19b to permit electrical connection to each end of each stack 14, are placed at the ends of block 12. A-cell 13, which is of generally tubular form, fits over the sandwich comprising end discs 18a and 18b and block 12 therebetween.

A-cell 13 comprises: a negative electrode consisting of a thin sheet 26 preferably of magnesium; an electrolyte body consisting of two thin sheets 27a and 27b preferably of glass fibre cloth impregnated with a suitable electrolyte; and a positive electrode consisting of thin inner and outer sheets 28a and 28b preferably of silver.

A-cell 13 is preferably fabricated by first stacking suitably-sized flat rectangular sheets of the materials indicated in the preceding paragraph. The edges 22 of outer sheet 28b, which is wider than the other sheets, are then crimped over the edges of sheet 28a. This stack may then be bent around a cylindrical mandrel until the two ends of inner sheet 28a overlap slightly and these two ends may be fastened together, preferably by welding. Sheet 28b is short enough so that its ends do not quite meet. Sheets 26, 27a, and 27b, all of which are longer than sheet 28b, are brought out through the gap betwen the ends of sheet 28b. This arrangement permits electrical connection to be made to the free end of sheet 26.

B-stacks 14 each comprise a number of B-cells 31 assembled in a tube 32. Tube 32 may conveniently be of soft brass, with an insulating inner liner 33.

B-cells 31 each comprise: a cup 41, preferably of silver, that serves as the outer container for the cell and as one electrode; a thin insulating liner 42, preferably of asbestos, on the inside of cup 41; an electrolyte body 43, consisting preferably of a disk of asbestos or other inert fibrous material impregnated with a suitable electrolyte, resting on the bottom of the inside of cup 41; an inner electrode, preferably of magnesium in the form of a generally discoid button 44 having a top protuberance 45, the bottom surface of button 44 resting on the top surface of electrolyte body 43; and an insulating washer 48, preferably of fiber, fitting around protuberance 45 and resting on the top surface of the main body portion of electrode button 44.

The subassembly consisting of silver cup 41 and asbestos liner 42 is preferably formed by laying a sheet of Chrysotile asbestos paper having a starch or other organic binder on a sheet of silver and stamping to form straight-sided cups. After stamping, the cups are fired to drive off the organic binder from the asbestos. Electrolyte body 43 is then positioned inside the cup, and sufficient heat is applied or maintained to permit some of the electrolyte with which body 43 is impregnated to melt and flow into the interstices of asbestos liner 42. Electrode button 44 and insulating washer 48 are then positioned, after which the sides of cup 41 are crimped over on washer 48 to complete the assembly of cell 31.

In the assembly of stack 14 the lower end of tube 32 is preferably first crimped inward to provide support for an insulating washer 51. A conductive disc 52 is then positioned on top of washer 51. A wire lead 21b welded to disc 52 extends through washer 51 and through hole 19b in end plate 18b.

The desired number of cells 31 may now be stacked on top of conductive disc 52. The undersurface of silver cup 41 of the bottommost of cells 31 makes electrical contact with disc 52. The undersurface of silver cup 41 of each of the subsequent cells 31 makes electrical contact with the protuberance 45 that extends upward from the electrode button 44 of the cell 31 immediately below. An insulating washer 53, the center of which passes protuberance 45, is preferably interposed between each two adjacent cells 31.

After the desired number of cells 31 have been stacked in tube 32 a terminal-and-spring assembly, comprising a metal disc 55, a helical spring 56, another metal disc 57, and a wire lead 21a, is positioned on top of the topmost of cells 31 and makes contact with protuberance 45 extending therefrom. An insulating cup 61, having an axial hole to pass wire lead 21a, is then slipped over wire lead 21a so that it rests on disc 57. Finally, to complete the assembly of stack 14, the top end of tube 32 may be crimped over.

After all of B-stacks 14 have been assembled in block 12, the various stacks 14 may readily be connected in series if desired, by appropriate and obvious interconnection of the leads 21a and 21b coming from the various stacks 14. It may facilitate series interconnection of stacks 14 if stacks 14 are inserted in block 12 with alternate polarities. Electrical connection to A-cell 13 may be made by soldering suitable wire leads to outer sheet 28b and to the free end of sheet 26. The use of various obvious or well-known devices or materials to add mechanical strength to, and to provide protection for, the completed battery assembly described may be desirable. For example, it may be desirable to wrap the assembly described with glass fiber cloth or similar material and then to hermetically seal it in a metal container, bringing the necessary electrical leads out through suitable metal-glass seals.

Although only two cells 31 are shown in the stack 14 shown in FIG. 2, it will be understood that it is feasible to make each cell 31 quite small and to use a large number of cells 31 in a stack 14 of moderate length. In one practical embodiment that has been constructed, some of the characteristics of which have been mentioned in an introductory paragraph above, each of six stacks 14 is approximately ¼ inch in diameter by 1⅛ inch long and comprises 15 individual cells 31.

Electrolyte body 43 is preferably stamped from sheet material made by impregnating suitable asbestos paper with a suitable electrolyte. We prefer to start with Chrysotile asbestos paper having an organic binder and to fire the paper to drive off the binder. The fired paper may then be dipped in a molten electrolyte of a type that is solid and inert at normal temperatures but that becomes molten and active at elevated temperatures. Various such electrolytes, suitable for thermal batteries, are known and may be used. We prefer to use the following composition:

| Material: | Parts by weight |
| --- | --- |
| Potassium chromate | 3.7 |
| Potassium chloride | 27.8 |
| Lithium nitrate | 68.5 |

Sheets 27a and 27b comprising the electrolyte body of A-cell 13 are preferably cut from larger sheets made by impregnating glass fiber cloth with a suitable molten electrolyte. The requirements for this electrolyte are broadly similar to the requirements for the electrolyte of electrolyte body 43 in the B cells 31, and suitable electrolytes are known. However, for sheets 27a and 27b we prefer to use the following somewhat modified composition:

| Material: | Parts by weight |
| --- | --- |
| Potassium chromate | 1 |
| Potassium chloride | 4 |
| Sodium chloride | 1 |
| Calcium chloride, anhydrous | 0.5 |
| Lithium nitrate | 5 |

Ignitible block 12 is preferably prepared as follows: An intermediate material A is prepared, starting with

| Material: | Parts by weight |
| --- | --- |
| Potassium perchlorate | 17.53 |
| Powdered zirconium | 4.07 |
| Barium chromate | 12.05 |
| Iron by Hydrogen (N.F. Grade) | 66.35 |

These four materials are mixed in a ball mill with alcohol, using 1 cc. of anhydrous denatured alcohol for each 2 grams of the dry mixture. After drying completely, 47.00 parts (by weight) of material A and 52.75 parts of Iron by Hydrogen (N.F. Grade) are thoroughly mixed with 0.25 part of a suitable mold-release agent, such as calcium stearate or a commercial product known as Sterotex, in a suitable blender. A small amount—up to about 0.02 part—of a vapor phase inhibitor such as dicyclohexylammonium nitrate is preferably included. The resulting material is pressed in a mold to form block 12. So formed, block 12 has good combustion characteristics and substantially maintains its mechanical dimensions and strength during and after burning. Although we consider the composition just described to be superior for the present purpose, we are aware that other heating compositions, adaptable to use for block 12, are known or will suggest themselves to skilled persons.

Igniter 16 consists essentially of (a) an ignitible body 71, of a composition similar to that of the heads of ordinary friction matches, and (b) a friction body 72, of a composition similar to that provided as a striking surface on the sides of boxes of ordinary friction matches, mounted on a shaft 73 and adapted to move into friction contact with body 71 in response to acceleration forces corresponding to those experienced by an ordinance projectile on firing. Body 71 is adapted to ignite in response to such friction contact, generating flame that is propagated through holes 76 to ignite block 12. Since well-developed igniters of this type are known to the thermal battery art, and since no particular construction of igniter 16 is claimed as part of the present invention, optimizing features of igniter 16 are not here shown or described.

It will be apparent that the embodiments shown are only exemplary and that various modifications can be made in construction and arrangement within the scope of the invention as defined in the appended claim.

We claim:
1. A thermal battery construction for use in an ordinance projectile, said battery construction comprising in combination: a matrix consisting of a cylindrical block of ignitable thermite-type material having longitudinal holes of circular cross section extending therethrough; a plurality of metal rods inserted in said blocks; a B-stack of generally cylindrical form mounted in one of said longitudinal holes, said B-stack comprising a plurality of stacked discoid cells connected in series and adapted to be activated upon application of sufficient heat thereto; an A-cell of generally tubular form surrounding and in contact with said cylindrical block so as to form an outer casing for said block, said A-cell having inner and outer electrically connected sheets of a first metal constituting one electrode of said A-cell, a middle sheet of a second metal constituting the other electrode of said A-cell, and first and second sheets of inert pervious electrically non-conductive material interposed between said middle sheet and said inner and outer sheets respectively, said non-conductive material being impregnated with an electro- lyte, said A-cell being adapted to be activated upon application of sufficient heat thereto; means for connecting said B-stack and said A-cell to associated circuitry; and an igniter mounted in one of said longitudinal holes and adapted to ignite said block in response to a predetermined condition; said block being so formed that it has good combustion characteristics and substantially maintains its mechanical dimensions and strength during and after burning, said metal rods acting to increase the uniformity of distribution of the heat produced by said burning, the heat thereby applied to said B-stack and said A-cell being sufficient to cause activation thereof.

References Cited

UNITED STATES PATENTS

| | | | |
|---|---|---|---|
| 713,652 | 11/1902 | Kitsee | 136—4 |
| 1,417,075 | 5/1922 | La Cour et al. | 44—3.3 |
| 2,081,926 | 6/1937 | Gyuris | 136—83 |
| 2,680,063 | 6/1954 | Shapiro | 44—3 |
| 1,611,153 | 12/1926 | Benner et al. | 136—111.3 |
| 2,473,546 | 6/1949 | Ruben | 136—107 |

OTHER REFERENCES

Goodrich et al.: J. of Electrochemical Soc. vol. 99, No. 8, pp. 207c, 208c, August 1952.

BENJAMIN R. PADGETT, *Primary Examiner.*

M. J. McGREAL, *Assistant Examiner.*

U.S. Cl. X.R.

136—90